(12) United States Patent
Nagayasu et al.

(10) Patent No.: US 9,061,550 B2
(45) Date of Patent: Jun. 23, 2015

(54) PNEUMATIC TIRE

(75) Inventors: Masaaki Nagayasu, Hiratsuka (JP); Hiroshi Furusawa, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 946 days.

(21) Appl. No.: 13/237,341

(22) Filed: Sep. 20, 2011

(65) Prior Publication Data
US 2012/0285591 A1 Nov. 15, 2012

(30) Foreign Application Priority Data

May 12, 2011 (JP) ................. 2011-106974

(51) Int. Cl.
*B60C 11/03* (2006.01)
*B60C 11/11* (2006.01)
*B60C 11/12* (2006.01)

(52) U.S. Cl.
CPC .............. *B60C 11/0304* (2013.04); *B60C 11/11* (2013.01); *B60C 2011/0381* (2013.04); *B60C 11/0306* (2013.04); *B60C 2011/0341* (2013.04); *B60C 2011/0348* (2013.04); *B60C 11/1236* (2013.04); *B60C 2011/0372* (2013.04)

(58) Field of Classification Search
CPC ............ B60C 2011/0374; B60C 11/03; B60C 11/0304; B60C 11/0306; B60C 11/11; B60C 11/12; B60C 11/1236; B60C 2011/0372; B60C 2011/0381; B60C 2011/1213; B60C 2011/0358

USPC ......... 152/209.1, 209.8, 209.15, 209.18, 902; D12/557–567, 525–532, 592–603
See application file for complete search history.

(56) References Cited

U.S. PATENT DOCUMENTS

2007/0089821 A1* 4/2007 Kishizoe .................... 152/209.2
2010/0078105 A1* 4/2010 Hashimoto .............. 152/209.18
2010/0206446 A1* 8/2010 Oizumi .................... 152/209.18

FOREIGN PATENT DOCUMENTS

JP 2009-096220 A 5/2009

* cited by examiner

*Primary Examiner* — Eric Hug
(74) *Attorney, Agent, or Firm* — Global IP Counselors, LLP

(57) ABSTRACT

A pneumatic tire has a good balance between on-ice and on-snow performances. The tire includes a tread portion having longitudinal and lateral grooves defining block rows. Each block in the block rows includes sipes. A length of each block in the first and second block rows is not less than 1.5 times and not more than 2.5 times a length of each third block row block. A width of each second block row block is larger than a width of each first block row block. The lateral grooves defining the first and second block row blocks are offset in the tire circumferential direction by not less than 0.2 times and not more than 0.8 times the length of each first block row block. The lateral grooves defining the second and third block row blocks communicate with each other while inclining in the same direction.

18 Claims, 7 Drawing Sheets

PNEUMATIC TIRE

CROSS-REFERENCE TO RELATED APPLICATIONS

This application claims priority to Japanese Patent Application No. 2011-106974, filed on May 12, 2011, the entire disclosure of which is hereby incorporated herein by reference.

BACKGROUND

1. Field of the Invention

The present invention relates to a pneumatic tire suitable for winter use. More particularly, the present invention relates to a pneumatic tire having improved in on-ice performance and on-snow performance.

2. Background Information

A pneumatic tire for winter use such as a studless tire conventionally has a particular configuration. Specifically, multiple longitudinal grooves extending in a tire circumferential direction and multiple lateral grooves extending in a tire width direction are provided in a tread portion, and these longitudinal and lateral grooves define multiple blocks. Multiple sipes extending in the tire width direction are provided in each of the blocks as described, for example, in Japanese patent application Kokai publication No. 2009-96220.

Such a pneumatic tire for winter use typically requires both on-ice performance and on-snow performance. Generally, when the on-ice performance is to be improved, the number of sipes to be provided in each block is increased to increase the edge effect exhibited by the sipes. However, providing many sipes in each block reduces the block stiffness, and thus, reduces the driving stability on snow. In some cases, even the on-ice performance is reduced due to collapsing of the blocks. Accordingly, it is difficult to improve both the on-ice performance and the on-snow performance at the same time.

SUMMARY

An object of the present invention is to provide a pneumatic tire having a good balance between improved in on-ice performance and improved on-snow performance.

A pneumatic tire according to a disclosed embodiment for achieving the above object comprises a tread portion extending in a tire circumferential direction and forming a ring shape; a pair of sidewall portions disposed on both sides of the tread portion, respectively; and a pair of bead portions disposed on inner sides of the sidewall portions in a tire radial direction, respectively. The tread portion is provided with a plurality of longitudinal grooves extending in the tire circumferential direction and a plurality of lateral grooves extending in a tire width direction, with the longitudinal grooves and the lateral grooves defining a plurality of block rows each including a plurality of blocks, and each of the plurality of blocks in the plurality of block rows being provided with a plurality of sipes extending in the tire width direction. The plurality of longitudinal grooves include a first longitudinal groove disposed at a position closest to a tire equator, a second longitudinal groove disposed closer to one contact end in the tire width direction than the first longitudinal groove, and a third longitudinal groove disposed closer to the one contact end in the tire width direction than the second longitudinal groove. The plurality of block rows include a first block row defined between the first longitudinal groove and the second longitudinal groove, a second block row defined between the second longitudinal groove and the third longitudinal groove, and a third block row defined in a shoulder region closer to the one contact end in the tire width direction than the third longitudinal groove. A length of each of the blocks included in the first block row and the second block row is not less than 1.5 times and not more than 2.5 times a length of each of the blocks included in the third block row, and a width of each of the blocks included in the second block row is larger than a width of each of the blocks included in the first block row. The lateral grooves defining the blocks of the first block row and the lateral grooves defining the blocks of the second block row are disposed to be offset from each other in the tire circumferential direction by a distance not less than 0.2 times and not more than 0.8 times the length of each of the blocks in the first block row, and the lateral grooves defining the blocks of the second block row and the lateral grooves defining the blocks of the third block row are disposed to communicate with each other while inclining in the same direction with respect to the tire width direction.

Also, the length of each block included in the first block row and the second block row is made larger than the length of each block included in the third block row located in the shoulder region. Thus, the stiffness of each block included in the first block row and the second block row is made relatively higher. Moreover, the lateral grooves defining the blocks of the first block row and the lateral grooves defining the blocks of the second block row are disposed to be offset from each other in the tire circumferential direction. Thus, the blocks included in the first block row and the second block row restrain each other from collapsing. As a result, even if many sipes are provided in each block of the first block row and the second block row, reduction in block stiffness due to these sipes can be avoided. Thus, a good balance between the on-ice performance and the on-snow performance can be achieved in a pneumatic tire for winter use, such as a studless tire.

Furthermore, the width of each block included in the second block row is made larger than the width of each block included in the first block row. By this configuration, the stiffness of each block located on the outer side of the tread portion is made larger. Thus, the driving stability on snow can be improved. In addition, the lateral grooves defining the blocks of the second block row and the lateral grooves defining the blocks of the third block row are disposed to communicate with each other while inclining in the same direction with respect to the tire width direction. This configuration improves the snow discharging performance, and thus the driving stability on snow can be improved.

In addition, a groove width of the second longitudinal groove is preferably smaller than a groove width of the third longitudinal groove. Making the second longitudinal groove narrower improves an effect of the blocks included in the first block row and the second block row supporting each other, and thus the driving stability on snow can be improved.

Also, a width of each of the blocks included in the second block row is preferably not less than 1.2 times and not more than 1.5 times a width of each of the blocks included in the first block row. Thus, the driving stability on snow can be improved.

The first longitudinal groove preferably has the largest groove width among the plurality of longitudinal grooves. Disposing the first longitudinal groove having the largest groove width in a center region of the tread portion improves an initial response when a steering wheel is steered in on-snow driving, and thus the driving stability on snow can be improved.

Each of the blocks included in the first block row and the second block row is preferably provided with one closed groove having one end thereof closed in the block. Such closed grooves improve the on-snow braking performance while hardly reducing the stiffness of each block. Particularly, it is preferable that the lateral grooves and the closed grooves in the first block row be inclined in the same direction with respect to the tire width direction, and that the lateral grooves and the closed grooves in the second block row be inclined in the same direction with respect to the tire width direction. This configuration improves the snow discharging performance, and thus the driving stability on snow can be improved.

An inclined angle of the lateral grooves and the closed grooves with respect to the tire width direction in the first block row is preferably 15° to 40°, and an inclined angle of the lateral grooves and the closed grooves with respect to the tire width direction in the second block row is preferably 15° to 40°. This configuration allows a large snow-column shearing force to be obtained in on-snow driving while securing sufficient block stiffness. Thus, the on-snow braking performance can be improved.

The disclosed embodiments are applicable to a pneumatic tire designed to be mounted on a vehicle in a way that either side of the tire faces to an outside of the vehicle. However, the disclosed embodiments are also applicable to a pneumatic tire having such an asymmetrical tread pattern that the tire is mounted on a vehicle with a designated side of the tire facing an outside of the vehicle. When the pneumatic tire has such an asymmetrical tread pattern that the tire is mounted on a vehicle with a designated side of the tire facing an outside of the vehicle, the first to third block rows are preferably disposed in a region closer to an outer side of the vehicle than the tire equator in the tread portion. This configuration effectively improves the driving stability on snow.

Moreover, in the pneumatic tire having such an asymmetrical tread pattern that the tire is mounted on a vehicle with a designated side of the tire facing an outside of the vehicle, the plurality of longitudinal grooves preferably include a fourth longitudinal groove disposed closer to the other contact end in the tire width direction than the first longitudinal groove, and a fifth longitudinal groove disposed closer to the other contact end in the tire width direction than the fourth longitudinal groove. The plurality of block rows preferably include a fourth block row defined between the first longitudinal groove and the fourth longitudinal groove, a fifth block row defined between the fourth longitudinal groove and the fifth longitudinal groove, and a sixth block row defined in a shoulder region closer to the other contact end in the tire width direction than the fifth longitudinal groove. The fifth block row adjacent to the sixth block row preferably has the largest block width among the block rows located between the first longitudinal groove and the fifth longitudinal groove. In other words, it is preferable that, in the region closer to the inner side of the vehicle than the tire equator in the tread portion, the fifth block row have the largest block width among the block rows located between the first longitudinal groove and the fifth longitudinal groove. This configuration makes the stiffnesses of the blocks located on the outer side of the tread portion larger, also in the region closer to the inner side of the vehicle. Thus, the driving stability on snow can be improved.

A length of each of the blocks included in the fourth block row is preferably not less than 0.7 times and not more than 1.3 times the length of each of the blocks included in the first block row, and the lateral grooves defining the blocks of the first block row and the lateral grooves defining the blocks of the fourth block row are preferably disposed to be offset from each other in the tire circumferential direction by a distance not less than 0.2 times and not more than 0.8 times the length of each of the blocks in the first block row. Disposing the blocks with longer length in the center region of the tread portion as described above improves the driving stability on snow. Moreover, by disposing the lateral grooves defining the blocks in the first row and the lateral grooves defining the blocks in the fourth row to offset from each other in the tire circumferential direction, the blocks included in the first block row and the fourth block row can restrain each other from collapsing.

The lateral grooves defining the blocks of the fifth block row and the lateral grooves defining the blocks of the sixth block row are preferably disposed to communicate with each other while inclining in the same direction with respect to the tire width direction. This configuration improves the snow discharging performance, and thus the driving stability on snow can be improved.

It should also be noted that the grooves widths and the groove depths of the longitudinal grooves are not particularly limited. For example, the groove widths are each 2 mm or more and 15 mm or less, and the groove depths are each 6 mm or more and 10 mm or less. The closed groove is defined as a groove which has the maximum groove width of 2 mm or more and 10 mm or less (preferably, 3 mm or more and 7 mm or less) and the maximum groove depth of 5 mm or more and 10 mm or less. Meanwhile, the sipe is defined as a groove having a groove width of 1 mm or less. Moreover, the closed groove is a groove having an end portion closed in the block. However, it is acceptable that a sipe with a width of 1 mm or less communicates with the closed end portion. Such a sipe with narrow width does not substantially deteriorate the effects obtained by closing the grooves.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
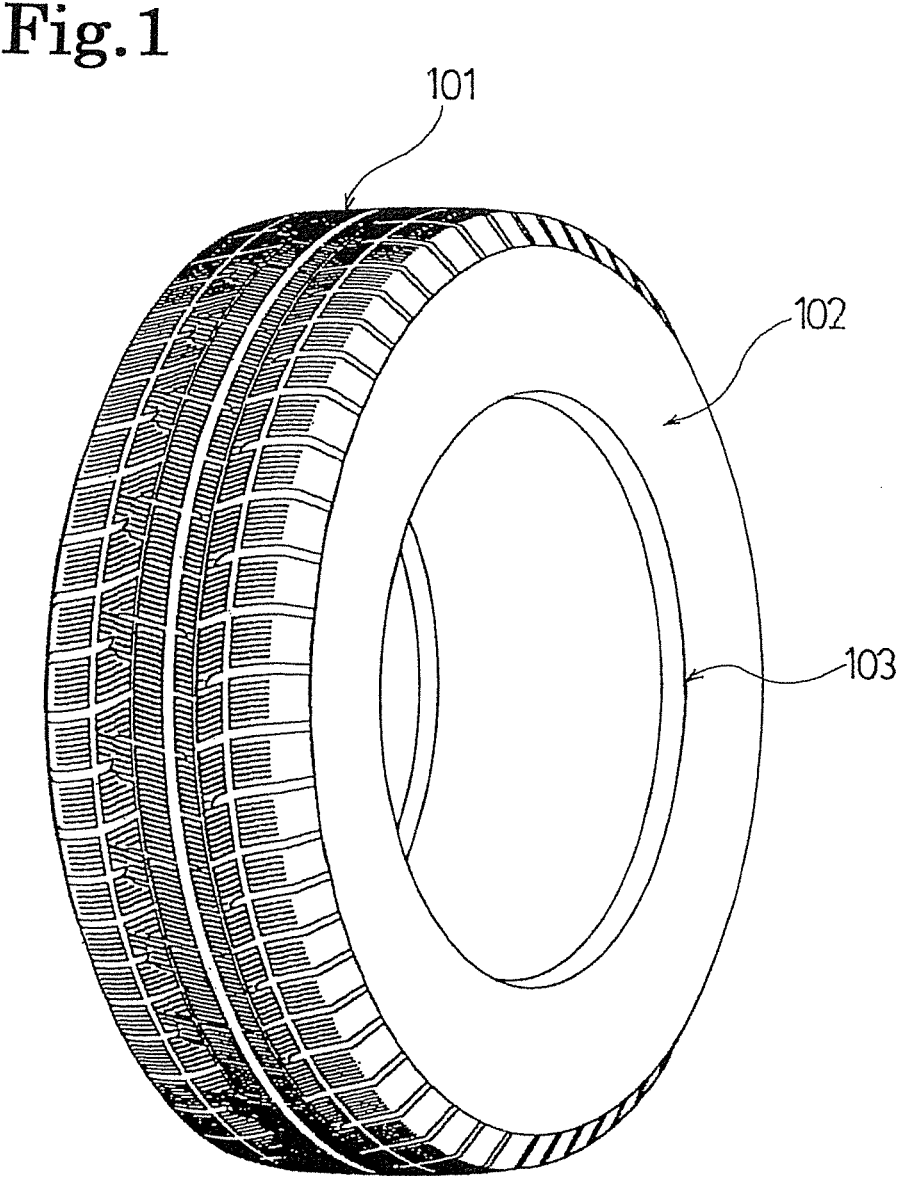
FIG. 1 is a perspective view showing a pneumatic tire according to a disclosed embodiment.
Figure 2:
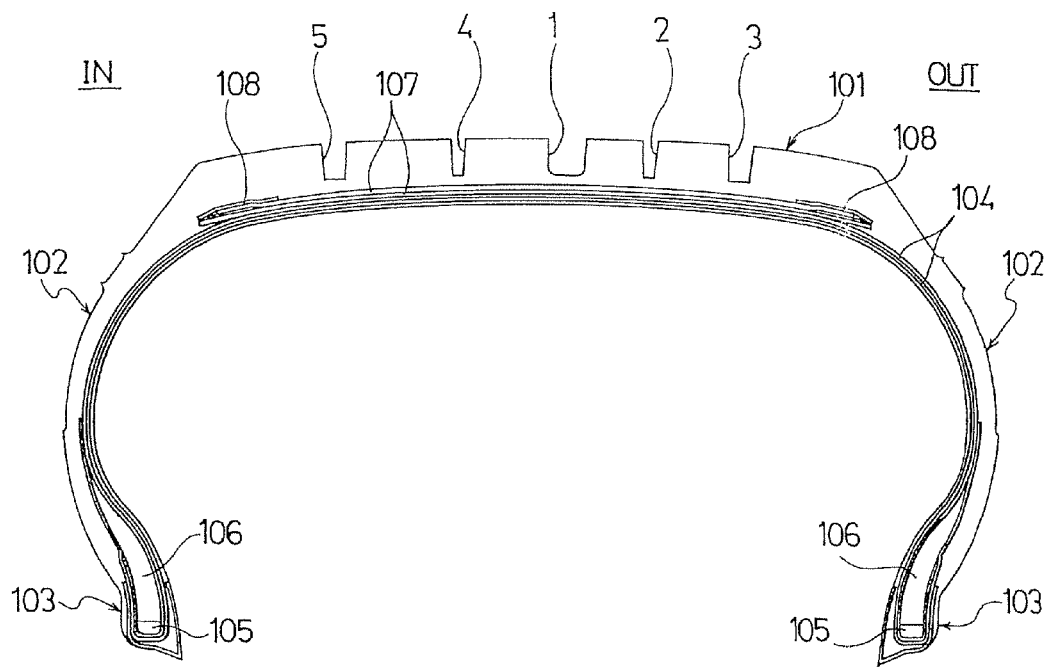
FIG. 2 is a meridian cross-sectional view of the pneumatic tire shown in FIG. 1.

FIGS. 1 and 2 show a pneumatic tire according to a disclosed embodiment. As shown in FIGS. 1 and 2, the pneumatic tire of the embodiment includes a tread portion 101 extending in a tire circumferential direction and having a ring shape, a pair of sidewall portions 102 respectively disposed on both sides of the tread portion 101, and a pair of bead portions 103 respectively disposed on inner sides of the sidewall portions 102 in a tire radial direction.

Two carcass layers 104 are installed extending from one bead portion 103 to the other bead portion 103. Each of these carcass layers 104 includes multiple reinforcement cords extending in the tire radial direction, and is folded back around a bead core 105 from the inner side to the outer side of the tire, the bead core 105 being provided in each of the bead portions 103. A bead filler 106 having a triangular cross section and being made of a rubber composition is disposed on an outer circumference of each of the bead core 105.

Multiple belt layers 107 are embedded in the tread portion 101 at a portion on the outer circumference side of the carcass layers 104. These belt layers 107 include multiple reinforcement codes inclined with respect to the tire circumferential direction. The reinforcement codes in one layer are disposed so as to intersect with the reinforcement codes in another layer. In the belt layers 107, angles at which the reinforcement codes are inclined with respect to the tire circumferential direction is set within a range of, for example, 10° to 40°. At least one belt cover layer 108 is disposed on an outer circumference side of the belt layers 107. The belt cover layer 108 is provided to improve a high-speed durability, and includes reinforcement codes arranged at an angle of, for example, 5° or less with respect to the tire circumferential direction. It should also be noted that, the tire internal configuration of the tire described above is a typical example of a pneumatic tire, and the invention is not limited to this configuration.

Figure 3:
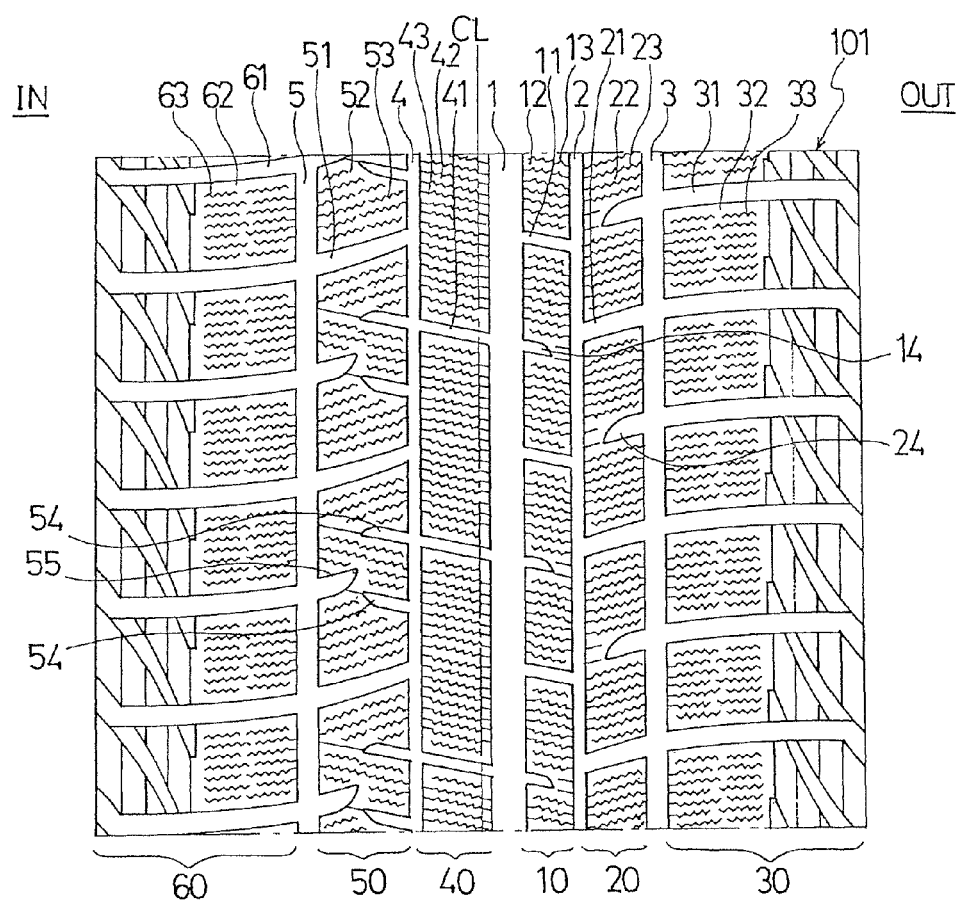
FIG. 3 is a developed view showing a tread pattern of the pneumatic tire shown in FIG. 1.
Figure 4:
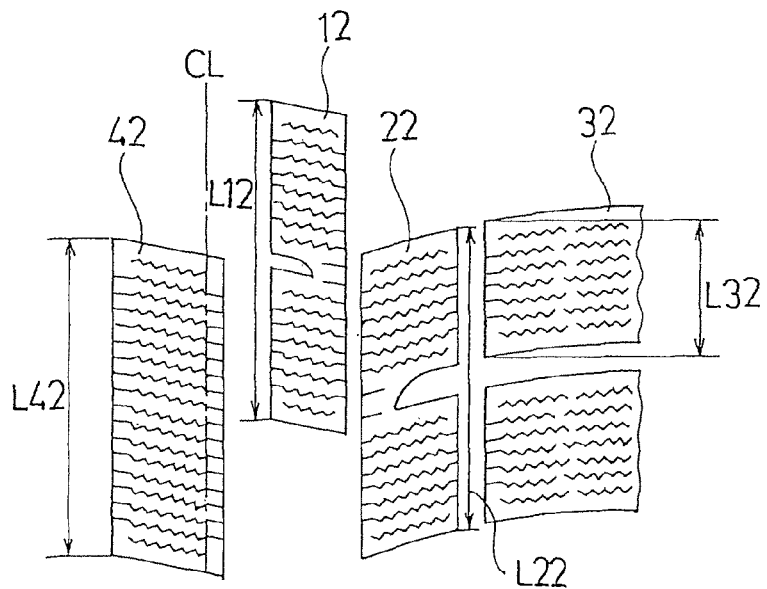
FIG. 4 is a plan view showing a main portion of the tread pattern shown in FIG. 3 in enlarged manner.
Figure 5:
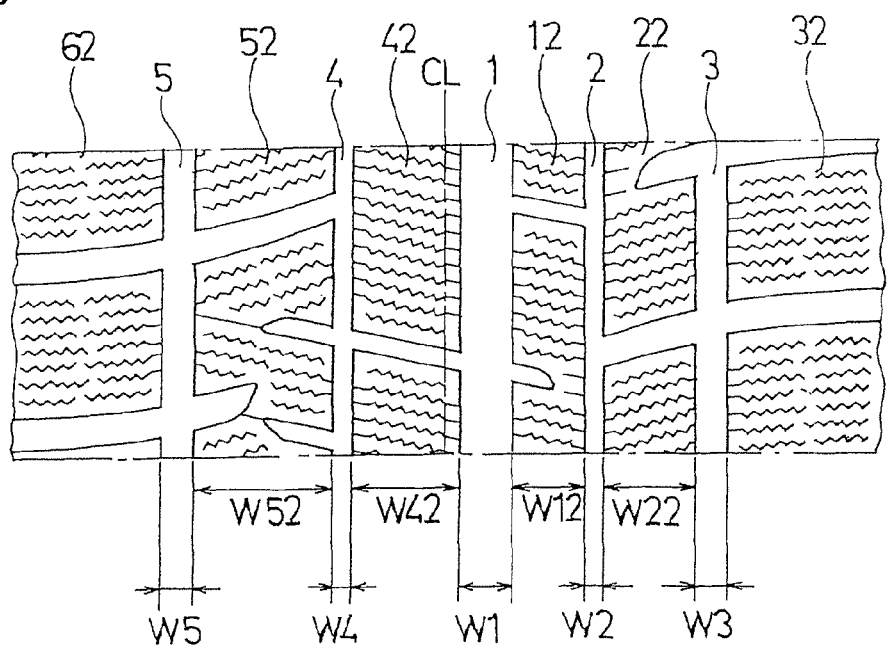
FIG. 5 is a plan view showing a main portion of the tread pattern shown in FIG. 3 in enlarged manner.
Figure 6:
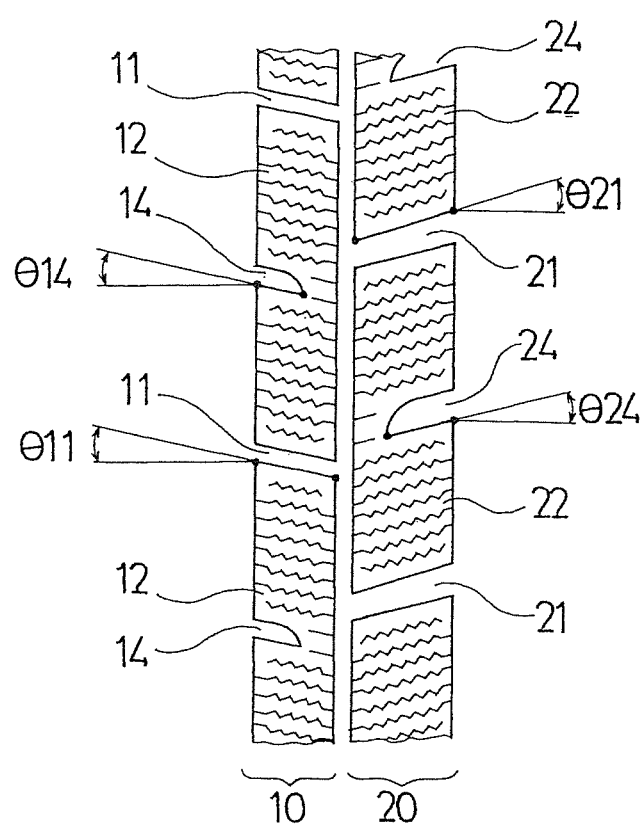
FIG. 6 is a plan view showing a main portion of the tread pattern shown in FIG. 3 in enlarged manner.

FIG. 3 shows a tread pattern of the pneumatic tire of the embodiment shown in FIGS. 1 and 2. FIGS. 4 to 6 each show a main portion of the tread pattern. The pneumatic tire of this embodiment has such an asymmetrical tread pattern that the tire is to be mounted on a vehicle with a designated side thereof facing an outside of the vehicle. IN indicates an inner side of a vehicle, and OUT indicates an outer side of the vehicle.

As shown in FIG. 3, multiple longitudinal grooves 1, 2, 3, 4, and 5 extending in the tire circumferential direction and multiple lateral grooves 11, 21, 31, 41, 51, and 61 extending in a tire width direction are formed in the tread portion 101. Multiple block rows 10, 20, 30, 40, 50, and 60 including multiple blocks 15, 22, 32, 42, 52, and 62 are defined by the longitudinal grooves 1 to 5 and the lateral grooves 11 to 61.

Specifically, the longitudinal groove 1 (first longitudinal groove) is disposed at a position closest to a tire equator CL, the longitudinal groove 2 (second longitudinal groove) is disposed closer to one contact end (a first contact end) of the tread portion 101 in a tire width direction (outer side of the vehicle) than the longitudinal groove 1, and the longitudinal groove 3 (third longitudinal groove) is disposed closer to the one contact end (first contact end) of the tread portion 101 in the tire width direction (outer side of the vehicle) than the longitudinal groove 2. Also, the longitudinal groove 4 (fourth longitudinal groove) is disposed closer to the other the contact end (second contact end) of the tread portion 101 in the tire width direction (inner side of the vehicle) than the longitudinal groove 1, and the longitudinal groove 5 (fifth longitudinal groove) is disposed closer to the other contact end (second contact end) of the tread portion 101 in the tire width direction (inner side of the vehicle) than the longitudinal groove 4.

The block row 10 (first block row) is defined between the longitudinal groove 1 and the longitudinal groove 2, the block row 20 (second block row) is defined between the longitudinal groove 2 and the longitudinal groove 3, and the block row 30 (third block row) is defined in a shoulder region (first shoulder region) closer to the one contact end (first contact end) in the tire width direction (outer side of the vehicle) than the longitudinal groove 3. Also, the block row 40 (fourth block row) is defined between the longitudinal groove 1 and the longitudinal groove 4, the block row 50 (fifth block row) is defined between the longitudinal groove 4 and the longitudinal groove 5, and the block row 60 (sixth block row) is defined in a shoulder region (second shoulder region) closer to the other contact end (second contact end) in the tire width direction (inner side of the vehicle) than the longitudinal groove 5.

The block row 10 includes multiple blocks 12 defined by the longitudinal grooves 1, 2 and the lateral grooves 11. Multiple sipes 13 extending in the tire width direction and each having a zigzag shape on a tread surface are formed in each block 12. Moreover, in each block 12, one closed groove 14 is provided whose one end is closed in the block 12 and the other end is opened to the longitudinal groove 1 adjacent to the block 12.

The block row 20 includes multiple blocks 22 defined by the longitudinal grooves 2, 3 and the lateral grooves 21. Multiple sipes 23 extending in the tire width direction and each having a zigzag shape on the tread surface are formed in each block 22. Moreover, in each block 22, one closed groove 24 is provided whose one end is closed in the block 22 and the other end is opened to the longitudinal groove 3 adjacent to the block 22.

The block row 30 includes multiple blocks 32 defined by the longitudinal groove 3 and the lateral grooves 31. Multiple sipes 33 extending in the tire width direction and each having a zigzag shape on the tread surface are formed in each block 32. The block row 40 includes multiple blocks 42 defined by the longitudinal grooves 1, 4 and the lateral grooves 41. Multiple sipes 43 extending in the tire width direction and each having a zigzag shape on the tread surface are formed in each block 42.

The block row 50 includes multiple blocks 52 defined by the longitudinal grooves 4, 5 and the lateral grooves 51. Multiple sipes 53 extending in the tire width direction and each having a zigzag shape on the tread surface are formed in each block 52. Moreover, in each block 52, two closed grooves 54 are provided whose one end is closed in the block 52 and the other end is opened to the longitudinal groove 4 adjacent to the block 52, and one closed groove 55 is provided whose one end is closed in the block 52 and the other end is opened to the longitudinal groove 5 adjacent to the block 52.

The block row 60 includes multiple blocks 62 defined by the longitudinal groove 5 and the lateral grooves 61. Multiple sipes 63 extending in the tire width direction and each having a zigzag shape on the tread surface are formed in each block 62.

In the pneumatic tire described above, a length L12 of each block 12 included in the block row 10 in the tire circumferential direction and a length L22 of each block 22 included in the block row 20 in the tire circumferential direction are each not less than 1.5 times and not more than 2.5 times a length L32 of each block 32 included in the block row 30 in the tire circumferential direction (see FIG. 4). Making the lengths L12, L22 of the blocks 12, 22 larger than the length L32 of the block 32 in the shoulder region relatively improves the stiffness of each of the blocks 12, 22 included in the block rows 10, 20. If the lengths L12, L22 of the blocks 12, 22 are each smaller than 1.5 times the length L32 of the block 32, the stiffnesses of the blocks 12, 22 are not sufficiently secured. On the other hand, if the lengths L12, L22 of the blocks 12, 22 are each larger than 2.5 times the length L32 of the block 32, the on-snow performance is reduced.

In addition, the lateral grooves 11 defining the blocks 12 of the block row 10 and the lateral grooves 21 defining the blocks 22 of the block row 20 are disposed to be offset from each other in the tire circumferential direction by a distance not less than 0.2 times and not more than 0.8 times the length L12 of the block 12 of the block row 10, more preferably not less than 0.4 times and not more than 0.6 times the length L12. By disposing the lateral grooves 11 of the block row 10 and the lateral grooves 21 of the block row 20 in a manner offset from each other in the tire circumferential direction as described above, the blocks 12, 22 included in the block rows 10, 20 restrain each other from collapsing. If an offset amount between the lateral grooves 11 of the block row 10 and the lateral grooves 21 of the block row 20 is not in the above-described range, the effect of restraining the collapsing of the blocks 12, 22 is insufficient. Note that, the offset amount described here is a distance in the tire circumferential direction from a portion of one of the lateral grooves 11 opened to the longitudinal groove 2 to a portion of the corresponding one of the lateral grooves 21 opened to the longitudinal groove 2.

As described above, the lengths L12, 22 of the blocks 12, 22 are each made larger than the length L32 of the block 32 in the shoulder region, and the lateral grooves 11 of the block row 10 and the lateral grooves 21 of the block row 20 are disposed to be offset from each other in the tire circumferential direction. Thus, even if many sipes 13, 23 are provided in each of the blocks 12, 22 of the block rows 10, 20, the reduction in the stiffnesses of the blocks 12, 22 due to these sipes 13, 23 can be avoided. Hence, the on-ice performance and the on-snow performance can be improved in good balance in a pneumatic tire for winter use such as a studless tire.

Furthermore, a width W22 of each block 22 included in the block row 20 is larger than a width W12 of each block 12 included in the block row 10 (see FIG. 5). Preferably, the width W22 of the block 22 included in the block row 20 is not less than 1.2 times and not more than 1.5 times the width W12 of the block 12 included in the block row 10. Accordingly, the stiffness is larger in the order of the blocks 12 and the blocks 22, i.e. becomes larger toward the outside in the width direction of the tread portion 101. Thus, the driving stability on snow can be improved. If the width W22 of the block 22 is smaller than 1.2 times the width W12 of the block 12, the effect of increasing the stiffness of the block 22 is insufficient. On the other hand, if the width W22 of the block 22 is larger than 1.5 times the width W12 of the block 12, the effect of improving the driving stability on snow is reduced due to reduction in the groove area.

Each of the lateral grooves 21 defining the blocks 22 of the block row 20 and the corresponding one of the lateral grooves 31 defining the blocks 32 of the block row 30 are disposed to communicate with each other while inclining in the same direction with respect to the tire width direction. Disposing the lateral groove 21 of the block row 20 and the lateral groove 31 of the block row 30 to communicate with each other improves the snow discharging performance, and thus the driving stability on snow can be improved.

In the pneumatic tire described above, the groove width W2 of the longitudinal groove 2 is smaller than the groove width W3 of the longitudinal groove 3. Making the longitudinal groove 2 narrower improves the effect of the blocks 12, 22 included in the block rows 10, 20 supporting each other, and thus the driving stability on snow can be improved. Particularly, it is preferable to set the groove width W2 of the longitudinal groove 2 in a range of 2 mm to 6 mm, and the groove width W3 of the longitudinal groove 3 in a range of 4 mm to 10 mm.

Among the multiple longitudinal grooves 1 to 5, the longitudinal groove 1 has the groove width W1 which is the largest. In other words, the groove width W1 of the longitudinal groove 1 is set larger than the groove width W2 of the longitudinal groove 2, the groove width W3 of the longitudinal groove 3, a groove width W4 of the longitudinal groove 4, and a groove width W5 of the longitudinal groove 5. Disposing the longitudinal groove 1 having the groove width W1, which is the largest, in a center region of the tread portion 101 improves the initial response when a steering wheel is steered in on-snow driving, and thus the driving stability on snow can be improved. In other words, the wide longitudinal groove 1 securely grips a snow surface. Particularly, it is preferable to set the groove width W1 of the longitudinal groove 1 in a range of 5 mm to 15 mm.

One closed groove 14 is disposed in each block 12 included in block row 10, and one closed groove 24 is disposed in each block 22 included in block row 20, the closed grooves 14, 24 having one ends closed. Such closed grooves 14, 24 improve the on-snow braking performance while hardly reducing the stiffnesses of the blocks 12, 22. In a case where the closed grooves 14, 24 are added, it is preferable that the lateral grooves 11 and the closed grooves 14 in the block row 10 be inclined in the same direction with respect to the tire width direction, and that the lateral grooves 21 and the closed grooves 24 in the block row 20 be inclined in the same direction with respect to the tire width direction. This configuration improves the snow discharging performance, and thus the driving stability on snow can be improved.

Inclined angles $\theta11$, $\theta14$ of the lateral grooves 11 and the closed grooves 14 in the block row 10 with respect to the tire width direction is set in a range of 15° to 40°, and inclined angles $\theta21$, $\theta24$ of the lateral grooves 21 and the closed grooves 24 in the block row 20 with respect to the tire width direction is set in a range of 15° to 40° (see FIG. 6). This configuration allows a large snow-column shearing force to be obtained in on-snow driving while securing sufficient stiffnesses of the blocks 12, 22. Thus, the on-snow braking performance can be improved. If the inclined angles $\theta11$, $\theta14$, $\theta21$, and $\theta24$ are less than 15°, the driving stability on snow is reduced. On the other hand. if the inclined angles $\theta11$, $\theta14$, $\theta21$, and $\theta24$ are more than 40°, the stiffnesses of the blocks 12, 22 are reduced, and the on-snow braking performance based on the snow-column shearing force is also reduced. Note that, each of the inclined angles $\theta11$, $\theta14$, $\theta21$, $\theta24$ are determined based on a straight line passing through both ends of the longer one of groove wall surfaces of the corresponding groove.

The pneumatic tire described above has such an asymmetrical tread pattern that the tire is to be mounted on a vehicle with a designated side thereof facing an outside of the vehicle, and the block rows 10, 20, 30 having the characteristics described above are disposed in a region closer to the outer side of the vehicle than the tire equator CL in the tread portion 101. Thus, the driving stability on snow can be effectively improved.

Also, in a region closer to the inner side of the vehicle than the tire equator CL in the tread portion 101, the block row 50 adjacent to the block row 60 in the shoulder region has the largest block width among the block rows 40, 50 disposed between the longitudinal groove 1 and the longitudinal groove 5. In other words, regarding the widths W42, W52 of the blocks 42, 52 included in the block rows 40, 50, the width W52 is larger than the width W42. Thus, also in the region closer to the inner side of the vehicle, the stiffness of the blocks 42, 52 becomes larger toward the outside in the width direction of the tread portion 101. Thus, the driving stability on snow can be improved.

The length L42 of each block 42 included in the block row 40 in the tire circumferential direction is set to be not less than 0.7 times and not more than 1.3 times the length L12 of each blocks 12 included in the block row 10 in the tire circumferential direction. In other words, the length L42 of the block 42 is similar to the length L12 of the block 12. By thus disposing the relatively long blocks 42 in the center region of the tread portion 101, the driving stability on snow can be improved.

In addition, the lateral grooves 11 defining the blocks 12 of the block row 10 and the lateral grooves 41 defining the blocks 42 of the block row 40 are disposed to be offset from each other in the tire circumferential direction by a distance not less than 0.2 times and not more than 0.8 times the length L12 of the block 12 of the block row 10, more preferably not less than 0.4 times and not more than 0.6 times the length L12. By disposing the lateral grooves 11 of the block row 10 and the lateral grooves 41 of the block row 40 in a manner offset from each other in the tire circumferential direction, the blocks 12, 42 included in the block rows 10, 40 restrain each other from collapsing. If an offset amount between the lateral grooves 11 of the block row 10 and the lateral grooves 41 of the block row 40 is not in the above-described range, the effect of restraining the collapsing of the blocks 12, 42 is insufficient. Note that, the offset amount described here is a distance in the tire circumferential direction from a portion of one of the lateral grooves 11 opened to the longitudinal groove 1 to a portion of the corresponding one of the lateral grooves 41 opened to the longitudinal groove 1.

Each of the lateral grooves 51 defining the blocks 52 of the block row 50 and the corresponding one of the lateral grooves 61 defining the blocks 62 of the block row 60 are disposed to communicate with each other while inclining in the same direction with respect to the tire width direction. Disposing the lateral groove 51 of the block row 50 and the lateral groove 61 of the block row 60 to communicate with each other improves the snow discharging performance, and thus the driving stability on snow can be improved.

Figure 7:
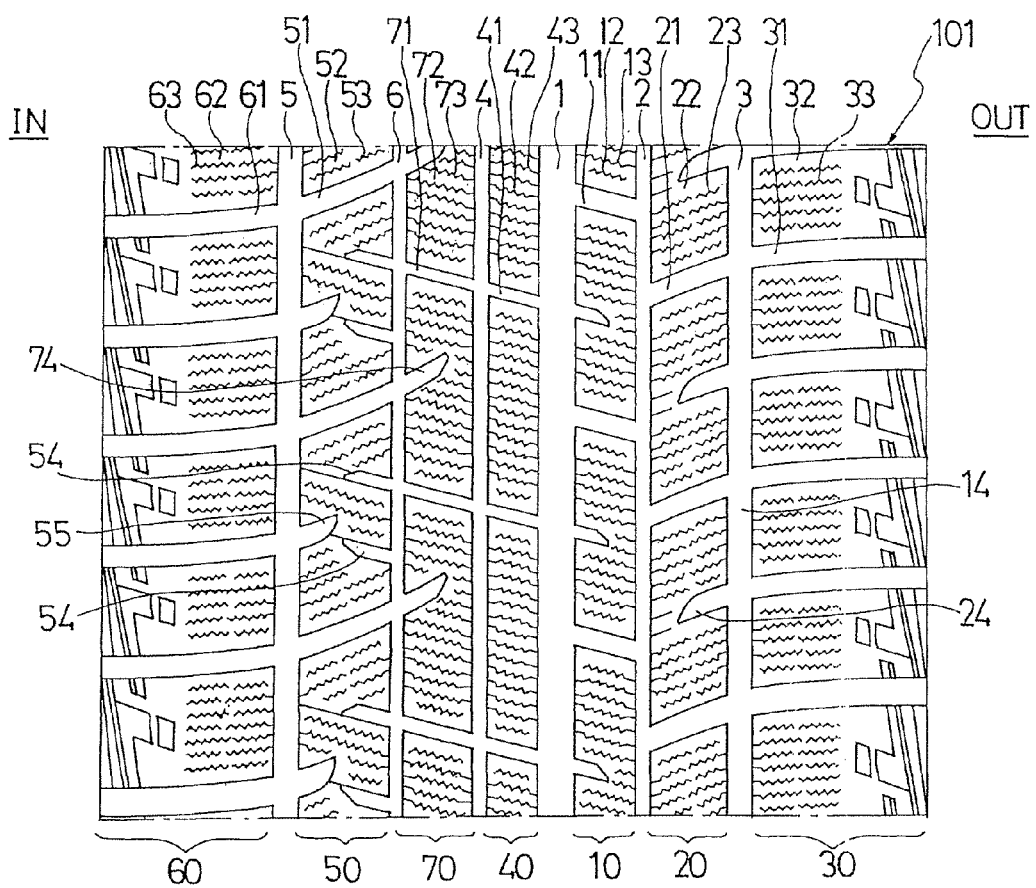
FIG. 7 is a developed view showing a tread pattern of the pneumatic tire according to another disclosed embodiment.

FIG. 7 is a view showing a tread pattern of a pneumatic tire of another disclosed embodiment. The pneumatic tire of the embodiment has more longitudinal grooves than that of the embodiment described above. The same parts as those in FIG. 3 are denoted by the same reference numerals and detailed descriptions thereof are omitted.

As shown in FIG. 7, a longitudinal groove 6 (sixth longitudinal groove) extending in the tire circumferential direction is added between the longitudinal groove 4 and the longitudinal groove 5 in the tread portion 101. Thus, a block row 70 (seventh block row) is defined between the longitudinal groove 4 and the longitudinal groove 6.

The block row 70 includes multiple blocks 72 defined by the longitudinal grooves 4, 6 and the lateral grooves 71. Multiple sipes 73 extending in the tire width direction and each having a zigzag shape on the tread surface are formed in each block 72. Moreover, in each block 72, one closed groove 74 is provided whose one end is closed in the block 72 and the other end is opened to the longitudinal groove 6 adjacent to the block 72. The number of the longitudinal grooves can be increased in accordance with the width of the tread portion 101 as described above.

It should be understood that various modifications, substitutions, and replacements can be made on the embodiments described herein without departing from the scope of the invention.

As discussed below, Table 1 illustrates six examples of pneumatic tires (Examples 1 to 6) with the following configuration were prepared. Each of the pneumatic tires had a tire size of 215/60R16 and such an asymmetrical tread pattern that the tire is to be mounted on a vehicle with a designated side thereof facing an outside of the vehicle. In each of the pneumatic tires, as shown in FIG. 1, multiple longitudinal grooves extending in a tire circumferential direction and multiple lateral grooves extending in a tire width direction were provided in a tread pattern, and multiple block rows each including multiple blocks were defined by these longitudinal grooves and lateral grooves. In each of the multiple blocks included in the multiple block rows, multiple sipes extending in the tire width direction were provided. The groove widths W1, W2, W3, W4, and W5 of the longitudinal grooves, the block widths W12, W22, W42, and W52 of the blocks included in the first to fourth block rows, absence or presence of closed grooves in the blocks included in the first and the second block rows were set as shown in Table 1 for each of Examples 1 to 6.

In each of Examples 1 to 6, the ratio of block lengths of the first to fourth block rows was L12:L22:L32:L42=2:2:1:2. The lateral grooves of the first block row and the lateral grooves of the second block row were disposed to be offset from each other in the tire circumferential direction by a distance equal to 0.5 times the block length L12. The lateral grooves of the first block row and the lateral grooves of the fourth block row were disposed to be offset from each other in the tire circumferential direction by a distance equal to 0.5 times the block length L12. Inclined angles $\theta 11$, $\theta 21$ of the lateral grooves of the first block row and the second block row were 25°. In a case where the closed grooves were provided in the blocks included in the first block row and the second block row, inclined angles $\theta 14$, $\theta 24$ of the closed grooves were 25°. Moreover, groove depths of the longitudinal grooves were all 9.1 mm.

Figure 8:
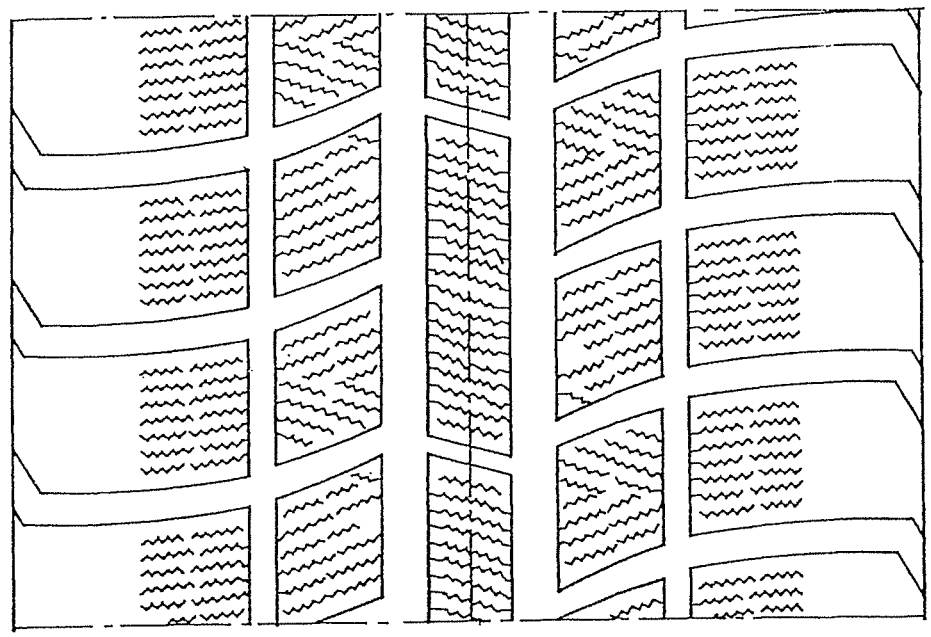
FIG. 8 is a developed view showing a tread pattern of a test tire (Comparative Example 1).

As for comparison, a tire of Comparative Example 1 having a tread pattern shown in FIG. 8 was prepared. Specifically, in the tire of Comparative Example 1, four longitudinal grooves extending in a tire circumferential direction and multiple lateral grooves extending in a tire width direction were provided in a tread portion, and five block rows each formed of multiple blocks were defined by the longitudinal grooves and the lateral grooves. In addition, multiple sipes extending in the tire width direction were provided in each of the multiple blocks included in the block rows. In the comparative example, groove widths of the two longitudinal grooves on the center side were 8 mm, and groove widths of the two longitudinal grooves on the shoulder sides were 6 mm. Groove depths of the longitudinal grooves were all 9.1 mm.

These test tires were evaluated for braking performance on ice and driving stability on snow by the evaluation method described below. The results thereof are thus shown in Table 1.

Braking Performance on Ice:

Each of the test tires was fitted onto a wheel having a rim size of 16×7J, inflated to an air pressure of 230 kPa, and mounted on a test vehicle. Breaking was performed to stop the vehicle traveling at 40 km/h on ice, and a braking distance until the vehicle came to a complete stop was measured. The evaluation results are shown by indexes using inverses of measured values where the result of Comparative Example 1 is 100. A larger index means a better braking performance on ice.

Driving Stability on Snow:

Each of the test tires was fitted onto a wheel having a rim size of 16×7J, inflated to an air pressure of 230 kPa, and mounted on a test vehicle. Then, a sensory test was performed on snow by a test driver. The evaluation results are shown by indexes where the result of Comparative Example 1 is 100. A larger index means a better driving stability on snow.

TABLE 1

|  |  | Comparative Example 1 | Example 1 | Example 2 | Example 3 | Example 4 | Example 5 | Example 6 |
|---|---|---|---|---|---|---|---|---|
| Groove width of longitudinal groove (mm) | W1 | — | 6.0 | 6.0 | 7.0 | 6.0 | 6.0 | 7.0 |
|  | W2 | — | 4.5 | 3.5 | 3.5 | 4.5 | 3.5 | 3.5 |
|  | W3 | — | 6.0 | 6.0 | 6.0 | 6.0 | 6.0 | 6.0 |
|  | W4 | — | 3.5 | 3.5 | 3.5 | 3.5 | 3.5 | 3.5 |
|  | W5 | — | 6.0 | 6.0 | 6.0 | 6.0 | 6.0 | 6.0 |
| Block width (mm) | W11 | — | 11.0 | 13.0 | 12.0 | 11.0 | 13.0 | 12.0 |
|  | W21 | — | 15.0 | 15.0 | 15.0 | 15.0 | 15.0 | 15.0 |
|  | W41 | — | 17.0 | 17.0 | 17.0 | 17.0 | 17.0 | 17.0 |
|  | W51 | — | 23.0 | 23.0 | 23.0 | 23.0 | 23.0 | 23.0 |
| Present or absent of closed grooves |  | Absent | Absent | Absent | Absent | Present | Present | Present |
| Braking performance on ice |  | 100 | 105 | 105 | 105 | 105 | 105 | 105 |
| Driving stability on snow |  | 100 | 103 | 107 | 110 | 108 | 112 | 115 |

As is apparent from Table 1, tires of Examples 1 to 6 had a better braking performance on ice and a better driving stability on snow compared to the tire of Comparative Example 1.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a tread portion extending in a tire circumferential direction and forming a ring shape;
a pair of sidewall portions, each of the sidewall portions being respectively disposed on opposite sides of the tread portion; and
a pair of bead portions, each of the bead portions being disposed on respective inner sides of the sidewall portions in a tire radial direction;
the tread portion including a plurality of longitudinal grooves extending in the tire circumferential direction and a plurality of lateral grooves extending in a tire width direction, the longitudinal grooves and the lateral grooves defining a plurality of block rows each including a plurality of blocks, each of the blocks including a plurality of sipes extending in the tire width direction;
the plurality of longitudinal grooves include a first longitudinal groove disposed at a position proximate to a tire equator, a second longitudinal groove disposed between a first contact end of the tread portion and the first longitudinal groove in the tire width direction, and a third longitudinal groove disposed between the first contact end and the second longitudinal groove in the tire width direction, a groove width of the first longitudinal groove being larger than a groove width of any other of the longitudinal grooves;
the plurality of block rows include a first block row defined between the first longitudinal groove and the second longitudinal groove, a second block row defined between the second longitudinal groove and the third longitudinal groove, and a third block row defined in a first shoulder region between the first contact end and the third longitudinal groove in the tire width direction;
a length of each of the blocks included in the first block row and the second block row in the tire circumferential direction is not less than 1.5 times and not more than 2.5 times a length of each of the blocks included in the third block row;
a width of each of the blocks included in the second block row in the tire width direction is larger than a width of each of the blocks included in the first block row;
the lateral grooves defining the blocks of the first block row and the lateral grooves defining the blocks of the second block row are offset from each other in the tire circumferential direction by a distance not less than 0.2 times and not more than 0.8 times the length of each of the blocks in the first block row; and
the lateral grooves defining the blocks of the second block row and the lateral grooves defining the blocks of the third block row communicate with each other while inclining in the same direction with respect to the tire width direction.

2. The pneumatic tire according to claim 1, wherein a groove width of the second longitudinal groove is smaller than a groove width of the third longitudinal groove in the tire width direction.

3. The pneumatic tire according to claim 1, wherein a width of each of the blocks included in the second block row is not less than 1.2 times and not more than 1.5 times a width of each of the blocks included in the first block row in the tire width direction.

4. The pneumatic tire according to claim 1, wherein each of the blocks included in the first block row and the second block row includes one closed groove having one end thereof closed in its respective first or second block.

5. The pneumatic tire according to claim 2, wherein
a width of each of the blocks included in the second block row is not less than 1.2 times and not more than 1.5 times a width of each of the blocks included in the first block row in the tire width direction.

6. The pneumatic tire according to claim 2, wherein
each of the blocks included in the first block row and the second block row includes one closed groove having one end thereof closed in its respective first or second block.

7. The pneumatic tire according to claim 6, wherein
the lateral grooves and the closed grooves in the first block row are inclined in the same direction with respect to the tire width direction; and
the lateral grooves and the closed grooves in the second block row are inclined in the same direction with respect to the tire width direction.

8. The pneumatic tire according to claim 7, wherein
an inclined angle of the lateral grooves and the closed grooves with respect to the tire width direction in the first block row is in a range of 15 degrees to 40 degrees; and
an inclined angle of the lateral grooves and the closed grooves with respect to the tire width direction in the second block row is in a range of 15 degrees to 40 degrees.

9. The pneumatic tire according to claim 2, wherein
the tread portion has an asymmetrical tread pattern including the plurality of longitudinal grooves and the plurality of lateral grooves, such that the pneumatic tire is mounted on a vehicle with a designated side of the pneumatic tire facing an outside of the vehicle; and
the first, second and third block rows are disposed in a region of the tread pattern between an outer side of the vehicle and the tire equator in the tire width direction.

10. The pneumatic tire according to claim 9, wherein
the plurality of longitudinal grooves include a fourth longitudinal groove disposed between the tire equator and a second contact end of the tread portion opposite to the first contact end in the tire width direction, and a fifth longitudinal groove disposed between the second contact end and the fourth longitudinal groove in the tire width direction;
the plurality of block rows include a fourth block row defined between the first longitudinal groove and the fourth longitudinal groove, a fifth block row defined between the fourth longitudinal groove and the fifth longitudinal groove, and a sixth block row defined in a second shoulder region between the second contact end and the fifth longitudinal groove in the tire width direction; and
a block width of the fifth block row is larger than a block width of any of the block rows located between the first longitudinal groove and the fifth longitudinal groove in the tire width direction.

11. The pneumatic tire according to claim 10, wherein
a length of each of the blocks included in the fourth block row is not less than 0.7 times and not more than 1.3 times the length of each of the blocks included in the first block row in the tire circumferential direction; and
the lateral grooves defining the blocks of the first block row and the lateral grooves defining the blocks of the fourth block row are offset from each other in the tire circumferential direction by a distance not less than 0.2 times and not more than 0.8 times the length of each of the blocks in the first block row.

12. The pneumatic tire according to claim 10, wherein
the lateral grooves defining the blocks of the fifth block row and the lateral grooves defining the blocks of the sixth block row communicate with each other while inclining in the same direction with respect to the tire width direction.

13. A pneumatic tire comprising:
a tread portion extending in a tire circumferential direction and forming a ring shape;
a pair of sidewall portions, each of the sidewall portions being respectively disposed on opposite sides of the tread portion; and
a pair of bead portions, each of the bead portions being disposed on respective inner sides of the sidewall portions in a tire radial direction;
the tread portion including a plurality of longitudinal grooves extending in the tire circumferential direction and a plurality of lateral grooves extending in a tire width direction, the longitudinal grooves and the lateral grooves defining a plurality of block rows each including a plurality of blocks, each of the blocks including a plurality of sipes extending in the tire width direction;
the plurality of longitudinal grooves include a first longitudinal groove disposed at a position proximate to a tire equator, a second longitudinal groove disposed between a first contact end of the tread portion and the first longitudinal groove in the tire width direction, and a third longitudinal groove disposed between the first contact end and the second longitudinal groove in the tire width direction;
the plurality of block rows include a first block row defined between the first longitudinal groove and the second longitudinal groove, a second block row defined between the second longitudinal groove and the third longitudinal groove, and a third block row defined in a first shoulder region between the first contact end and the third longitudinal groove in the tire width direction;
each of the blocks included in the first block row and the second block row includes one closed groove having one end thereof closed in its respective first or second block;
a length of each of the blocks included in the first block row and the second block row in the tire circumferential direction is not less than 1.5 times and not more than 2.5 times a length of each of the blocks included in the third block row;
a width of each of the blocks included in the second block row in the tire width direction is larger than a width of each of the blocks included in the first block row;
the lateral grooves defining the blocks of the first block row and the lateral grooves defining the blocks of the second block row are offset from each other in the tire circumferential direction by a distance not less than 0.2 times and not more than 0.8 times the length of each of the blocks in the first block row;
the lateral grooves defining the blocks of the second block row and the lateral grooves defining the blocks of the third block row communicate with each other while inclining in the same direction with respect to the tire width direction;
the lateral grooves and the closed grooves in the first block row are inclined in the same direction with respect to the tire width direction; and
the lateral grooves and the closed grooves in the second block row are inclined in the same direction with respect to the tire width direction.

14. The pneumatic tire according to claim 13, wherein
an inclined angle of the lateral grooves and the closed grooves with respect to the tire width direction in the first block row is in a range of 15 degrees to 40 degrees; and an inclined angle of the lateral grooves and the closed grooves with respect to the tire width direction in the second block row is in a range of 15 degrees to 40 degrees.

15. A pneumatic tire comprising:

a tread portion extending in a tire circumferential direction and forming a ring shape;

a pair of sidewall portions, each of the sidewall portions being respectively disposed on opposite sides of the tread portion; and a pair of bead portions, each of the bead portions being disposed on respective inner sides of the sidewall portions in a tire radial direction;

the tread portion including a plurality of longitudinal grooves extending in the tire circumferential direction and a plurality of lateral grooves extending in a tire width direction, the longitudinal grooves and the lateral grooves defining a plurality of block rows each including a plurality of blocks, each of the blocks including a plurality of sipes extending in the tire width direction;

the plurality of longitudinal grooves include a first longitudinal groove disposed at a position proximate to a tire equator, a second longitudinal groove disposed between a first contact end of the tread portion and the first longitudinal groove in the tire width direction, and a third longitudinal groove disposed between the first contact end and the second longitudinal groove in the tire width direction;

the plurality of block rows include a first block row defined between the first longitudinal groove and the second longitudinal groove, a second block row defined between the second longitudinal groove and the third longitudinal groove, and a third block row defined in a first shoulder region between the first contact end and the third longitudinal groove in the tire width direction;

a length of each of the blocks included in the first block row and the second block row in the tire circumferential direction is not less than 1.5 times and not more than 2.5 times a length of each of the blocks included in the third block row;

a width of each of the blocks included in the second block row in the tire width direction is larger than a width of each of the blocks included in the first block row;

the lateral grooves defining the blocks of the first block row and the lateral grooves defining the blocks of the second block row are offset from each other in the tire circumferential direction by a distance not less than 0.2 times and not more than 0.8 times the length of each of the blocks in the first block row;

the lateral grooves defining the blocks of the second block row and the lateral grooves defining the blocks of the third block row communicate with each other while inclining in the same direction with respect to the tire width direction;

the tread portion has an asymmetrical tread pattern including the plurality of longitudinal grooves and the plurality of lateral grooves, such that the pneumatic tire is mounted on a vehicle with a designated side of the pneumatic tire facing an outside of the vehicle; and the first, second and third block rows are disposed in a region of the tread pattern between an outer side of the vehicle and the tire equator in the tire width direction.

16. The pneumatic tire according to claim 15, wherein the plurality of longitudinal grooves include a fourth longitudinal groove disposed between the tire equator and a second contact end of the tread portion opposite to the first contact end in the tire width direction, and a fifth longitudinal groove disposed between the second contact end and the fourth longitudinal groove in the tire width direction;

the plurality of block rows include a fourth block row defined between the first longitudinal groove and the fourth longitudinal groove, a fifth block row defined between the fourth longitudinal groove and the fifth longitudinal groove, and a sixth block row defined in a second shoulder region between the second contact end and the fifth longitudinal groove in the tire width direction; and a block width of the fifth block row is larger than a block width of any of the block rows located between the first longitudinal groove and the fifth longitudinal groove in the tire width direction.

17. The pneumatic tire according to claim 16, wherein a length of each of the blocks included in the fourth block row is not less than 0.7 times and not more than 1.3 times the length of each of the blocks included in the first block row in the tire circumferential direction; and the lateral grooves defining the blocks of the first block row and the lateral grooves defining the blocks of the fourth block row are offset from each other in the tire circumferential direction by a distance not less than 0.2 times and not more than 0.8 times the length of each of the blocks in the first block row.

18. The pneumatic tire according to claim 16, wherein the lateral grooves defining the blocks of the fifth block row and the lateral grooves defining the blocks of the sixth block row communicate with each other while inclining in the same direction with respect to the tire width direction.

* * * * *